(12) United States Patent
Cudak et al.

(10) Patent No.: US 12,346,282 B2
(45) Date of Patent: Jul. 1, 2025

(54) DYNAMIC BASEBOARD MANAGEMENT CONTROLLER MEMORY USE

(71) Applicant: Lenovo Enterprise Solutions (Singapore) Pte. Ltd., New Tech Park (SG)

(72) Inventors: Gary D Cudak, Raleigh, NC (US); Mehul Shah, Austin, TX (US); Glenn D Johnson, Apex, NC (US); Ajay Dholakia, Cary, NC (US); Ming Lei, Shanghai (CN)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 54 days.

(21) Appl. No.: 18/129,535

(22) Filed: Mar. 31, 2023

(65) Prior Publication Data

US 2024/0330228 A1    Oct. 3, 2024

(51) Int. Cl.
*G06F 13/42* (2006.01)
*G06F 13/16* (2006.01)

(52) U.S. Cl.
CPC ...... *G06F 13/4217* (2013.01); *G06F 13/1663* (2013.01); *G06F 13/1668* (2013.01)

(58) Field of Classification Search
CPC ............ G06F 13/4217; G06F 13/1663; G06F 13/1668
See application file for complete search history.

(56) References Cited

U.S. PATENT DOCUMENTS

| | | | |
|---|---|---|---|
| 10,248,486 B2 * | 4/2019 | Branco | G06F 11/3055 |
| 11,537,468 B1 * | 12/2022 | Ghosh | G06F 11/1068 |
| 2016/0147620 A1 * | 5/2016 | Lesartre | G06F 11/108 |
| | | | 714/6.3 |
| 2020/0394144 A1 * | 12/2020 | Osada | G06F 9/4406 |
| 2021/0103659 A1 * | 4/2021 | Ladkani | G06F 21/572 |
| 2021/0311900 A1 * | 10/2021 | Malladi | G06F 12/1045 |
| 2023/0140164 A1 * | 5/2023 | Chou | G06F 9/441 |
| | | | 713/2 |
| 2023/0297390 A1 * | 9/2023 | Hung | G06F 9/4401 |
| | | | 713/2 |

* cited by examiner

*Primary Examiner* — Henry Tsai
*Assistant Examiner* — Harry Z Wang
(74) *Attorney, Agent, or Firm* — Kunzler Bean & Adamson; Bruce R. Needham (57) ABSTRACT

Apparatuses, methods, systems, and program products are disclosed for dynamic baseboard management controller memory use. A method includes determining, by use of a processor, presence of main memory of a computing device, in response to determining that the main memory is not present in the computing device, preparing at least a portion of a memory device of a baseboard management controller for use by the processor, and making the at least a portion of the memory device of the BMC available to the processor.

20 Claims, 5 Drawing Sheets

DYNAMIC BASEBOARD MANAGEMENT CONTROLLER MEMORY USE

FIELD

The subject matter disclosed herein relates to computing devices and more particularly relates to dynamic baseboard management controller ("BMC") memory use.

BACKGROUND

In certain situations, computing devices are installed with memory to perform certain steps, actions, or functions during manufacturing, such as power-on tests, configuration, and preload, which can increase costs and delay manufacturing.

BRIEF SUMMARY

Apparatuses, methods, systems, and program products are disclosed for dynamic baseboard management controller memory use. In some embodiments, a method includes determining, by use of a processor, presence of main memory of a computing device, in response to determining that the main memory is not present in the computing device, preparing at least a portion of a memory device of a baseboard management controller for use by the processor, and making the at least a portion of the memory device of the BMC available to the processor.

In some embodiments, an apparatus includes a processor and non-transitory computer readable storage media storing code, the code being executable by the processor to perform operations that include determining, by use of a processor, presence of main memory of a computing device, in response to determining that the main memory is not present in the computing device, preparing at least a portion of a memory device of a baseboard management controller for use by the processor, and making the at least a portion of the memory device of the BMC available to the processor.

In some embodiments, a program product includes a non-transitory computer readable storage medium storing code, the code being configured to be executable by a processor to perform operations that include determining presence of main memory of a computing device, in response to determining that the main memory is not present in the computing device, preparing at least a portion of a memory device of a baseboard management controller for use by the processor, and making the at least a portion of the memory device of the BMC available to the processor.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R. Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in some embodiments." "in an embodiment," and similar language throughout this specification may, but do not necessarily, all refer to the same embodiment, but mean "one or more but not all embodiments" unless expressly specified otherwise. The terms "including," "comprising." "having." and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

Apparatuses, methods, systems, and program products are disclosed for dynamic baseboard management controller memory use. In some embodiments, a method includes determining, by use of a processor, presence of main memory of a computing device, in response to determining that the main memory is not present in the computing device, preparing at least a portion of a memory device of a baseboard management controller for use by the processor, and making the at least a portion of the memory device of the BMC available to the processor.

In one embodiment, the method includes determining presence of the main memory of the computing device during a boot process of the computing device. In some embodiments, the method includes preparing the at least a portion of the memory device of the BMC for use by the processor by creating a new partition on the memory device of the BMC and making the new partition of the memory device of the BMC available to the processor.

In some embodiments, the method includes preparing the at least a portion of the memory device of the BMC for use by the processor by configuring the at least a portion of the memory device of the BMC as shared memory and making the shared memory of the memory device of the BMC available to the processor. In some embodiments, the method includes making the at least a portion of the memory device of the BMC available for use by the processor as dynamic random access memory ("DRAM"), the DRAM accessible to the processor over a compute express link ("CXL").

In some embodiments, the method includes sending a notification to the BMC to prepare the at least a portion of a memory device of the BMC for use by the processor in response to determining that the main memory is not present in the computing device. In some embodiments, the method includes making the at least a portion of the memory device of the BMC available to the processor over at least one peripheral component interconnect express ("PCIe") bus of the computing device between the BMC and the processor.

In some embodiments, the method includes reverting the memory device of the BMC to an original state in response to detecting presence of the main memory of the computing device such that the at least a portion of the memory device of the BMC is not available for use by the processor. In some embodiments, the method includes erasing data stored on the at least a portion of the memory device of the BMC in response to reverting to the original state.

In some embodiments, the method includes reverting the memory device of the BMC to an original state during a boot process of the computing device prior to determining presence of main memory of the computing device such that the at least a portion of a memory device of the BMC is not available for use by the processor. In some embodiments, the main memory of the computing device comprises at least one dual in-line memory module ("DIMM").

In some embodiments, an apparatus includes a processor and non-transitory computer readable storage media storing code, the code being executable by the processor to perform operations that include determining, by use of a processor, presence of main memory of a computing device, in response to determining that the main memory is not present in the computing device, preparing at least a portion of a memory device of a baseboard management controller for use by the processor, and making the at least a portion of the memory device of the BMC available to the processor.

In some embodiments, the code is executable by the processor to perform operations that include determining presence of the main memory of the computing device during a boot process of the computing device. In some embodiments, the code is executable by the processor to perform operations that include preparing the at least a portion of the memory device of the BMC for use by the processor by creating a new partition on the memory device of the BMC and making the new partition of the memory device of the BMC available to the processor.

In some embodiments, the code is executable by the processor to perform operations that include preparing the at least a portion of the memory device of the BMC for use by the processor by configuring the at least a portion of the memory device of the BMC as shared memory and making the shared memory of the memory device of the BMC available to the processor. In some embodiments, the code is executable by the processor to perform operations that include making the at least a portion of the memory device of the BMC available for use by the processor as DRAM, the DRAM accessible to the processor over a CXL.

In some embodiments, the code is executable by the processor to perform operations that include sending a notification to the BMC to prepare the at least a portion of a memory device of the BMC for use by the processor in response to determining that the main memory is not present in the computing device. In some embodiments, the code is executable by the processor to perform operations that include making the at least a portion of the memory device of the BMC available to the processor over at least one PCIe bus of the computing device between the BMC and the processor.

In some embodiments, the code is executable by the processor to perform operations that include reverting the memory device of the BMC to an original state in response to detecting presence of the main memory of the computing device such that the at least a portion of the memory device of the BMC is not available for use by the processor. In some embodiments, the code is executable by the processor to perform operations that include erasing data stored on the at least a portion of the memory device of the BMC in response to reverting to the original state.

In some embodiments, the code is executable by the processor to perform operations that include reverting the memory device of the BMC to an original state during a boot process of the computing device prior to determining presence of main memory of the computing device such that the at least a portion of a memory device of the BMC is not available for use by the processor. In some embodiments, the main memory of the computing device comprises at least one DIMM.

In some embodiments, a program product includes a non-transitory computer readable storage medium storing code, the code being configured to be executable by a processor to perform operations that include determining presence of main memory of a computing device, in response to determining that the main memory is not present in the computing device, preparing at least a portion of a memory device of a baseboard management controller for use by the processor, and making the at least a portion of the memory device of the BMC available to the processor.

In some embodiments, the code is configured to be executable by a processor to perform operations that include determining presence of the main memory of the computing device during a boot process of the computing device. In some embodiments, the code is configured to be executable by a processor to perform operations that include preparing the at least a portion of the memory device of the BMC for use by the processor by creating a new partition on the memory device of the BMC and making the new partition of the memory device of the BMC available to the processor.

In some embodiments, the code is configured to be executable by a processor to perform operations that include preparing the at least a portion of the memory device of the BMC for use by the processor by configuring the at least a portion of the memory device of the BMC as shared memory and making the shared memory of the memory device of the BMC available to the processor. In some embodiments, the code is configured to be executable by a processor to perform operations that include making the at least a portion of the memory device of the BMC available for use by the processor as DRAM, the DRAM accessible to the processor over a CXL.

In some embodiments, the code is configured to be executable by a processor to perform operations that include sending a notification to the BMC to prepare the at least a portion of a memory device of the BMC for use by the processor in response to determining that the main memory is not present in the computing device. In some embodiments, the code is configured to be executable by a processor to perform operations that include making the at least a portion of the memory device of the BMC available to the processor over at least one PCIe bus of the computing device between the BMC and the processor.

In some embodiments, the code is configured to be executable by a processor to perform operations that include reverting the memory device of the BMC to an original state in response to detecting presence of the main memory of the computing device such that the at least a portion of the memory device of the BMC is not available for use by the processor. In some embodiments, the code is configured to be executable by a processor to perform operations that include erasing data stored on the at least a portion of the memory device of the BMC in response to reverting to the original state.

In some embodiments, the code is configured to be executable by a processor to perform operations that include reverting the memory device of the BMC to an original state during a boot process of the computing device prior to determining presence of main memory of the computing device such that the at least a portion of a memory device of the BMC is not available for use by the processor. In some embodiments, the main memory of the computing device comprises at least one DIMM.

In certain situations, computing devices are installed with memory to perform certain steps, actions, or functions during manufacturing, such as power-on tests, configuration, and preload, which can increase costs and delay manufacturing. To keep costs low, some systems are equipped with the lowest cost DIMMs, e.g., 8 GB or 16 GB, which are disposed of after use or stored for other configurations that may need them, but are generally unused, needlessly increasing the price of the computing device. The subject matter herein provides solutions to the foregoing problem by dynamically exposing at least a portion of a memory device of a BMC to a processor when no main memory is installed in the computing device, thus not requiring the installing of main memory modules in the computing device to perform various functions, e.g., during manufacturing, during startup, or the like.

Figure 1:
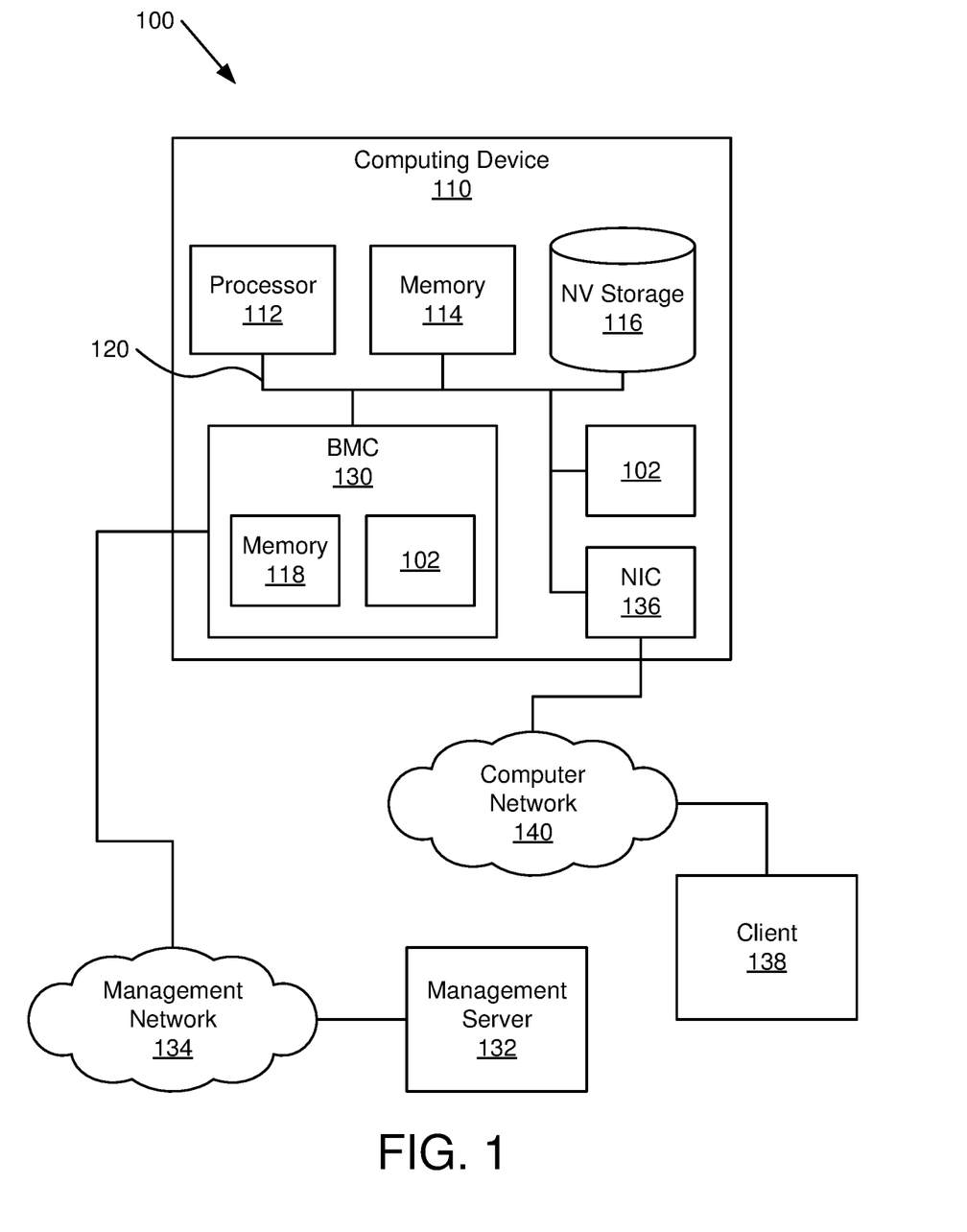
FIG. 1 is a schematic block diagram illustrating a system for dynamic baseboard management controller memory use, according to various embodiments.

FIG. 1 is a schematic block diagram illustrating a system 100 for dynamic baseboard management controller memory use, according to various embodiments. The system 100 includes a computing device 110, which may include a server device, e.g., within a datacenter or edge computing location, and which may be a standalone device or may be located in a rack of server devices. Other embodiments of the computing device 110 may include a workstation, an Internet of Things device, a consumer computing device, an enterprise computing device, and/or the like. The computing device 110, in some embodiments, may include a processor 112 (e.g., a central processing unit ("CPU"), a processor core, an FPGA or other programmable logic, an application specific integrated circuit ("ASIC"), a controller, a microcontroller, and/or another semiconductor integrated circuit device), a main memory 114 such as a volatile memory, and/or a non-volatile storage device 116, such as solid-state storage, a hard disk drive, or the like. In some embodiments, the main memory 114 of the computing device 110 is embodied as at least one DIMM, a single in-line memory module ("SIMM"), or the like.

The embodiments described herein include a memory management apparatus 102. The memory management apparatus 102, in some embodiments, is configured to determine presence of main memory 114 of a computing device 110. In some embodiments, the memory management apparatus 102, in response to determining that the main memory is not present in the computing device, prepares at least a portion of a memory device 118 of a BMC 130 for use by a processor 112 of the computing device 110. In certain embodiments, the memory management apparatus 102 makes the at least a portion of the memory device 118 of the BMC 130 available to the processor 112. In some embodiments, the memory management apparatus 102 is located on the BMC 130. In other embodiments, the memory management apparatus 102 is located on the computing device 110. In further embodiments, portions of the memory management apparatus 102 are located on the BMC 130 and the computing device 110. The memory management apparatus 102 is explained in more detail below with respect to the apparatuses 200, 300 of FIGS. 2 and 3.

In some embodiments, the computing device 110 includes a BMC 130 connected to a management server 132 over a management network 134. In some embodiments, the BMC 130 is called a service processor. As used herein, a BMC 130 may refer to a specialized processor used for remote monitoring and management of a computing device 110. A BMC 130, in some embodiments, has built in graphics and control logic, is located on the main motherboard of the computer, server, network or storage device (the "baseboard"), can be accessed remotely either via a dedicated or shared network connection, and has multiple connections to the computing device 110.

The BMC 130, in some embodiments, provides access to the computing device 110 over the management network 134 for various control functions, such as startup, shutdown, installation of software and firmware, upgrading of software and firmware, monitoring operation of the computing device 110, and the like. One embodiment of the BMC 130 is a Lenovo® XClarity® Controller ("XCC"). In some embodiments, a portion of the memory management apparatus 102 resides in the BMC 130.

In some embodiments, the BMC 130 is connected to various components of the computing device 110 over a system bus 120, or other data connection between the BMC 130 and the other components of the computing device 110. In some embodiments, the system bus 120 is embodied as a CXL that facilitates data communications between the BMC 130 and other components of the computing device 110. As used herein, CXL may refer to a high-speed, high capacity CPU-to-device, CPU-to-memory, or the like connections, designed for high performance computers such as data center computers. Further, in certain embodiments, CXL is built on the serial PCIe physical and electrical interface and includes PCIe-based block input/output protocols and cache-coherent protocols for accessing main memory 114 and the memory device 118.

In some embodiments, the BMC 130 includes a memory device 118. The memory device 118 may be located on the BMC 130 (e.g., as part of the BMC 130 chipset), may located on the baseboard and connected to the BMC 130 over a system bus 120, e.g., a CXL, or some combination thereof. The BMC 130 may manage the memory device 118 to partition, format, write data, store data, and/or the like. In some embodiments, as explained in more detail below, the BMC 130, in response to an instruction from the memory management apparatus 102, may make at least a portion of the memory device 118 available to the processor 112 of the computing device 110 for use by the processor 112, e.g., in response to the computing device 110 not having any main memory 114.

In some embodiments, the memory management apparatus 102 sends instructions, commands, signals, and/or the like to the BMC 130 and/or to the management server 132 via the BMC 130. In other embodiments, the memory management apparatus 102 sends and receives messages, alerts, notifications, and/or the like (e.g., communications that may not be related to BMC-managed functions of the computing device 110) through a network interface card ("NIC") 136 to/from a client 138 or other computer of a user over a computer network 140. While the BMC 130 is depicted as connected directly to the management network 134, in some embodiments, the BMC 130 communicates over the management network 134 through the NIC 136.

The management network 134 is typically a private network. In some embodiments, the management network 134 operates over a public network using a security protocol to remain private. The computer network 140 may be private or public. The computer network 140 and/or management network 134 may include LAN, a WAN, may include the Internet, may include a fiber network, etc. and may be made up of multiple networks and/or network types. In some embodiments, the computer network 140 and/or management network 134 include a wireless connection.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In some embodiments, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

Figure 2:
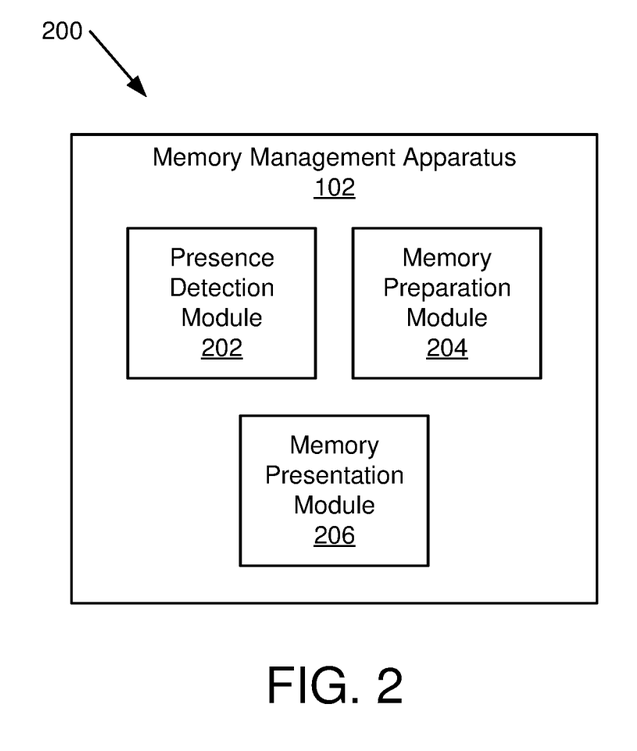
FIG. 2 is a schematic block diagram illustrating an apparatus for dynamic baseboard management controller memory use, according to various embodiments.

FIG. 2 is a schematic block diagram illustrating an apparatus 200 for dynamic baseboard management controller memory use, according to various embodiments. The apparatus 200 includes a memory management apparatus 102 with a presence detection module 202, a memory preparation module 204, and a memory presentation module 206, which are described below. In some embodiments, all, or a portion of the apparatus 200 is implemented using hardware circuits. In other embodiments, at least a portion of the apparatus 200 is implemented using a programmable hardware device and/or executable code stored in firmware or other non-volatile computer readable storage media. In some embodiments, all, or a portion of the apparatus 200 is located on the BMC 130, on a motherboard of the computing device 110, or some combination thereof. One of skill in the art will recognize other ways to implement the apparatus 200.

In some embodiments, the presence detection module 202 is configured to determine presence of main memory 114 of a computing device 110. For example, the presence detection module 202 may perform a memory check function, program, or the like; may attempt to write/read data to/from main memory 114; and/or the like to determine, check, detect, and/or the like the presence of main memory 114 in the computing device 110. For instance, in some embodiments, the presence detection module 202 determines whether main memory 114 is present in the computing device 110 during a boot process of the computing device 110, during a manufacturing process/a stage of manufacturing, and/or the like. In certain embodiments, the presence detection module 202 may check for the presence of particular types of main memory 114 such as SIMMs, DIMMs, and/or the like.

In some embodiments, the memory preparation module 204 is configured to prepare at least a portion of a memory device 118 of a BMC 130 for use by a processor 112 of the computing device 110, e.g., at least one of the main system processors, in response to the presence detection module 202 not detecting main memory 114 in the computing device 110. As described in more detail below, the memory preparation module 204 may dynamically create a partition of the memory device 118 on the BMC 130 for the processor 112 to use, may create or allocate a portion of the memory device 118 as shared memory for the processor 112 to use, and/or the like.

In such an embodiment, after the presence detection module 202 detects or determines that the computing device 110 does not have main memory 114, the memory preparation module 204 (e.g., located on the BMC 130, in communication with the BMC 130, or the like) instructs, commands, or otherwise signals the BMC 130 to prepare at least a portion of the memory device 118 on the BMC 130 or connected to the BMC 130 for use by the processor 112 such that the computing device 110 can use the memory device 118 on the BMC 130 to perform various actions, e.g., various startup actions during boot, without requiring installation or use of main or system memory 114.

In some embodiments, the memory presentation module 206 is configured to make the at least a portion of the memory device 118 of the BMC 130, which the memory preparation module 204 prepares for use, available to the processor 112, an operating system, a firmware (e.g., a basic input/output system, a unified extensible firmware interface, or the like), and/or the like. In some embodiments, the memory presentation module 206 makes the at least a portion of the memory device 118 of the BMC 130 available for use by the processor 112 as DRAM, or another type of volatile memory. In some embodiments, the memory presentation module 206 makes the at least a portion of the memory device 118 of the BMC 130 available for use by the processor 112 over a system bus 120 such as over a CXL connection, a PCIe bus, and/or the like between the BMC 130 and the processor 112.

In this manner, the memory management apparatus 102 allows the processor 112 or an operating system/firmware to perform various functions using the memory device 118 of the BMC 130 without requiring main memory 114 to be installed in the computing device 110. This may be the situation, for example, during different manufacturing stages for the computing device 110. Exposing the memory device 118 of the BMC 130 to the processor 112 and/or the operating system/firmware so that the processor 112 and/or the operating system/firmware can perform various functions, tests, system checks, monitoring tasks, and/or the like without use of main memory 114 alleviates purchasing, installing/uninstalling, managing, tracking, inventorying, and/or the like main memory modules that are used to perform temporary or short-term tasks, such as setup and testing during manufacturing. Such tasks or other uses of the memory device 118 of the BMC 130, in certain embodiments, may be restricted due to the limited amount of memory available on the memory device 118 of the BMC 130.

Figure 3:
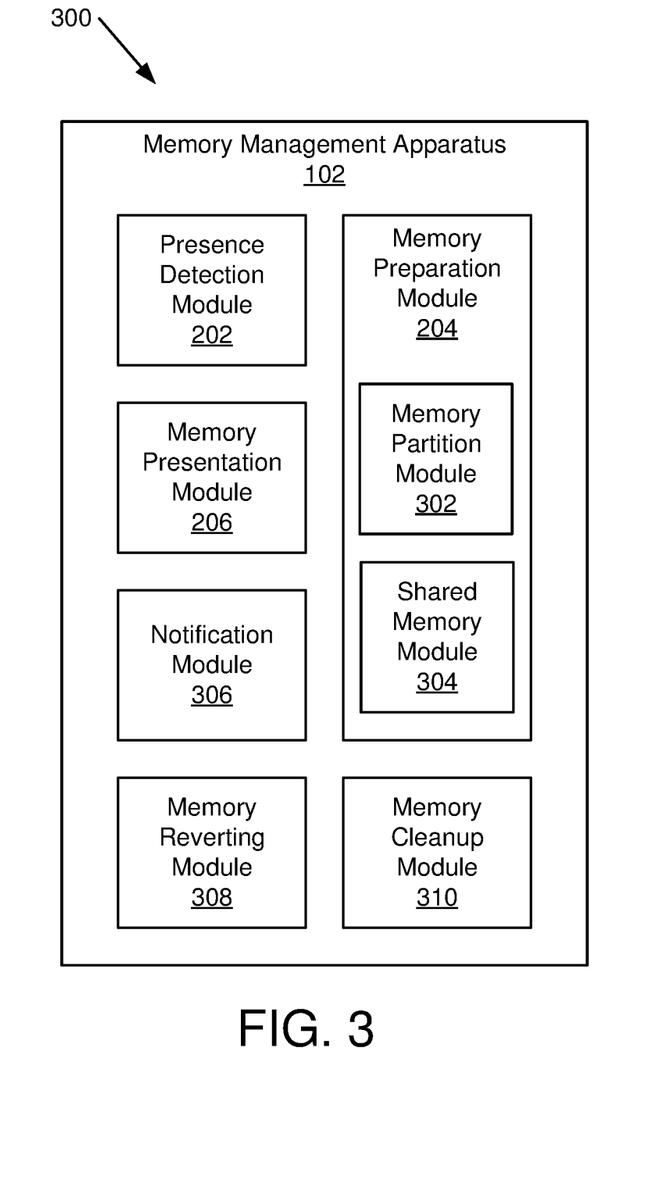
FIG. 3 is a schematic block diagram illustrating another apparatus for dynamic baseboard management controller memory use, according to various embodiments.

FIG. 3 is a schematic block diagram illustrating an apparatus 300 for dynamic baseboard management controller memory use, according to various embodiments. The apparatus 300 includes a memory management apparatus 102 with a presence detection module 202, a memory preparation module 204, and a memory presentation module 206, which may be substantially similar to the presence detection module 202, the memory preparation module 204, and the memory presentation module 206 described above with reference to FIG. 2. The apparatus 300 further includes a memory partition module 302 and a shared memory module 304, which may be part of the memory preparation module 204, a notification module 306, a memory reverting module 308, and a memory cleanup module 310, which are described in more detail below. In some embodiments, all, or a portion of the apparatus 300 is implemented using hardware circuits. In other embodiments, at least a portion of the apparatus 300 is implemented using a programmable hardware device and/or executable code stored in firmware or other non-volatile computer readable storage media. In some embodiments, all, or a portion of the apparatus 300 is located on the BMC 130, on a motherboard of the computing device 110, or some combination thereof. One of skill in the art will recognize other ways to implement the apparatus 300. One of skill in the art will recognize other ways to implement the apparatus 300.

In some embodiments, the memory partition module 302 is configured to prepare at least a portion of the memory device 118 of the BMC 130 for use by the processor 112 by creating a new partition on the memory device 118 of the BMC 130 and make the new partition of the memory device 118 of the BMC 130 available to the processor 112. For instance, the memory partition module 302 may reserve, set aside, designate, and/or the like a portion of the memory device 118 of the BMC 130 as a part, section, area, partition, or the like of the memory device 118 that is available for the processor 112 to use in the event that the presence detection module 202 does not detect main memory 114 in the computing device 110.

In some embodiments, the memory partition module 302 may receive an indication, signal, or other indicator from the presence detection module 202 and/or the memory preparation module 204 that the computing device 110 does not include main memory 114 and, in response, may dynamically partition, format, or otherwise make a portion of the memory device 118 of the BMC 130 available to the processor 112 for performing various functions, e.g., startup functions during boot.

In certain embodiments, the memory partition module 302 formats the dynamically generated partition of the memory device 118 of the BMC 130 in a format that is readable/writable by the processor 112, in a predetermined or predefined format, and/or the like. For instance, the memory partition module 302 may format the partition of the memory device 118 generated for the processor 112 as DRAM, static RAM ("SRAM"), and/or another type of volatile memory such that the partition of the memory device 118 of the BMC 130 is exposed to the processor 112 as if it is main memory 114 of the computing device 110 without requiring any changes, modifications, and/or the like to the way in which the processor 112 reads and writes data to main memory 114.

In some embodiments, the shared memory module 304 is configured to prepare the at least a portion of the memory device 118 of the BMC 130 for use by the processor 112 by configuring the at least a portion of the memory device 118 of the BMC 130 as shared memory and making the shared memory of the memory device 118 of the BMC 130 available to the processor 112. As used herein, shared memory may refer to memory that may be simultaneously accessed by multiple programs, devices, functions, and/or the like. For instance, the memory partition module 302 may allocate a portion of the memory device 118 of the BMC 130 as shared memory for use by the processor 112, may expose an existing shared memory partition on the memory device 118 to the processor 112, and/or the like in the event that the presence detection module 202 does not detect main memory 114 in the computing device 110.

In some embodiments, the shared memory module 304 may receive an indication, signal, or other indicator from the presence detection module 202 and/or the memory preparation module 204 that the computing device 110 does not include main memory 114 and, in response, may dynamically allocate or expose a shared memory partition of the memory device 118 of the BMC 130 and make it available to the processor 112 for performing various functions, e.g., startup functions during boot.

In certain embodiments, the shared memory module 304 formats the shared memory partition of the memory device 118 of the BMC 130 in a format that is readable/writable by the processor 112, in a predetermined or predefined format, and/or the like. For instance, the shared memory module 304 may format the partition of the memory device 118 generated for the processor 112 as DRAM, SRAM, and/or another type of volatile memory such that the partition of the memory device 118 of the BMC 130 is exposed to the processor 112 as if it is main memory 114 of the computing device 110 without requiring any changes, modifications, and/or the like to the way in which the processor 112 reads and writes data to main memory 114.

In some embodiments, the notification module 306 is configured to send a notification to the BMC 130 with an instruction, command, or the like to prepare at least a portion of a memory device 118 of the BMC 130 for use by the processor 112, e.g., to create/expose a partition of the memory device 118 to the processor 112, to allocate/expose a shared memory area of the memory device 118 to the processor 112, and/or the like, in response to determining that the main memory 114 is not present in the computing device 110. In response to receiving the notification, the notification module 306 located on or communicatively coupled to the BMC 130 may instruct, trigger, signal, or the like the request to prepare at least a portion of the memory device 118 for use by the processor 112.

In some embodiments, the notification module 306 is configured to send a notification to the processor 112, firmware, and/or the like with an indication, message, or the like that the memory device 118 is ready for use by the processor 112. In such an embodiment, the notification may include identifying information for the memory such as an identifier for the memory device 118, one or more addresses for the portion of the memory device 118 (e.g., logical and/or physical addresses) that the processor 112 can use, a range of addresses, a start address, an end address, pointer addresses to the available memory, the memory format, the communication bus that the memory device 118 is accessible over, and/or the like.

In some embodiments, the memory reverting module 308 is configured to revert the memory device 118 of the BMC 130 to an original state in response to detecting presence of main memory 114 in the computing device 110. The original state of the memory device 118, as used herein, may refer to a state of the memory device 118 prior to preparing and making available a portion of the memory device 118 to the processor 112, e.g., prior to creating a new memory partition, prior to creating and/or exposing shared memory to the processor 112, and/or the like.

In some embodiments, the presence detection module 202 may periodically check for the presence of main memory 114 in the computing device 110. If the presence detection module 202, in certain embodiments, detects the presence of main memory 114, e.g., if the presence detection module 202 detects that a DIMM device is installed in the computing device 110, the presence detection module 202 may notify the BMC 130, via the notification module 306, that the portion of the memory device 118 that the processor 112 is using is no longer needed, which may trigger the memory reverting module 308 to revert the portion of the memory device 118 that the processor 112 is using to an original state and/or to make the portion of the memory device 118 unavailable to the processor 112 so that it is available to the BMC 130.

In some embodiments, the memory reverting module 308 is configured to revert the memory device 118 of the BMC 130 to an original state during a boot process of the computing device 110 prior to determining presence of main memory 114 of the computing device 110 such that the at least a portion of a memory device 118 of the BMC 130 is not available for use by the processor 112. In such an embodiment, the processor 112 may have used a portion of the memory device 118 of the BMC 130 during a previous execution, boot, or the like. In some embodiments, the memory reverting module 308 may revert the memory device 118 to an original state, e.g., if a flag, partition, or other setting is set to indicate that the memory device 118 is available for the processor 112 to use, so that the memory device 118 is unavailable to the processor 112 until after the presence detection module 202 performs a memory check to determine whether the computing device 110 includes main memory 114 for the processor 112 to use.

In some embodiments, the memory reverting module 308 uses, signals, requests, instructs, commands, or the like the memory cleanup module 310 to erase data, mark data as deleted, remove a memory partition, remove a shared memory area, and/or the like of the memory device 118 that the processor 112 was using as part of reverting the memory device 118 to an original state. The memory cleanup module 310, for instance, may write zeroes over the data that the processor 112 was storing on the memory device 118, may mark the data on the portion of the memory device 118 as invalid or otherwise flag the data as deleted so that it is available for the BMC 130 to use.

Figure 4:
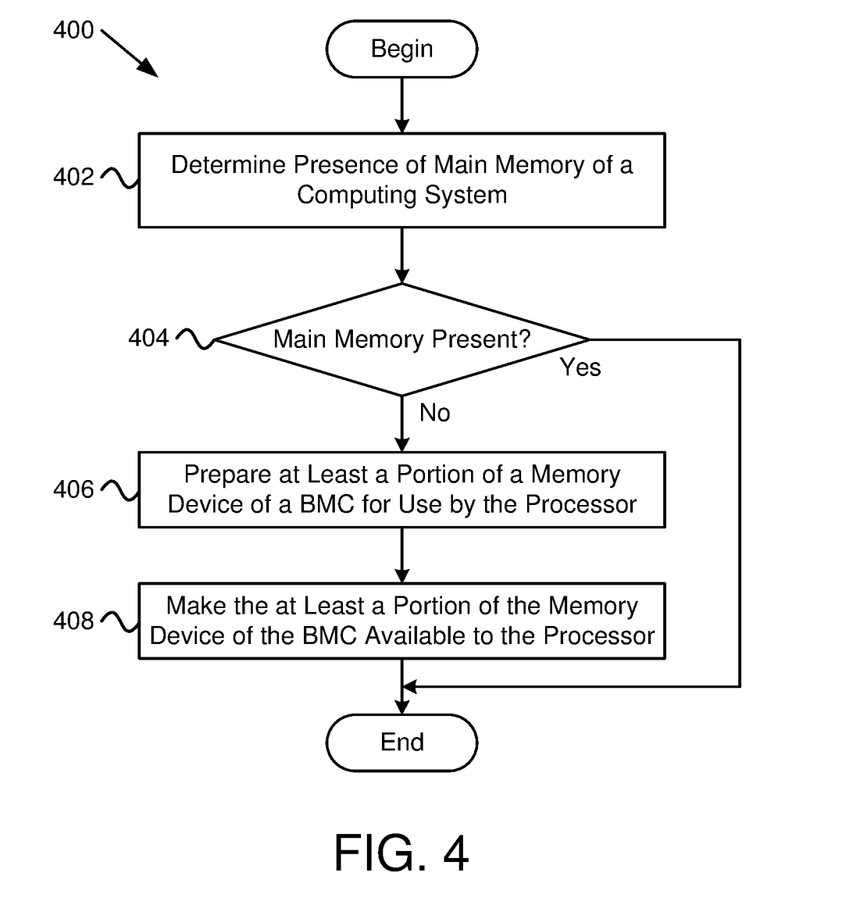
FIG. 4 is a schematic flow chart diagram illustrating a method for dynamic baseboard management controller memory use, according to various embodiments.

FIG. 4 depicts a schematic flow chart diagram describing one embodiment of a method 400 for dynamic baseboard management controller memory use. In some embodiments, the method 400 may be performed by a computing device 110, a BMC 130, a processor 112, a main memory 114, an FPGA, an ASIC, a memory management apparatus 102, a presence detection module 202, a memory preparation module 204, a memory presentation module 206, and/or the like.

In some embodiments, the method 400 begins and determines 402 presence of main memory 114 of a computing device 110. In some embodiments, if the method 400 determines 404 that the main memory 114 is present in the computing device 110, the method 400 ends. Otherwise, in some embodiments, the method 400 prepares 406 at least a portion of the memory device 118 of a BMC 130 for use by the processor 112. In further embodiments, the method 400 makes 408 the at least a portion of the memory device 118 of the BMC 130 available to the processor 112, and the method 400 ends.

Figure 5:
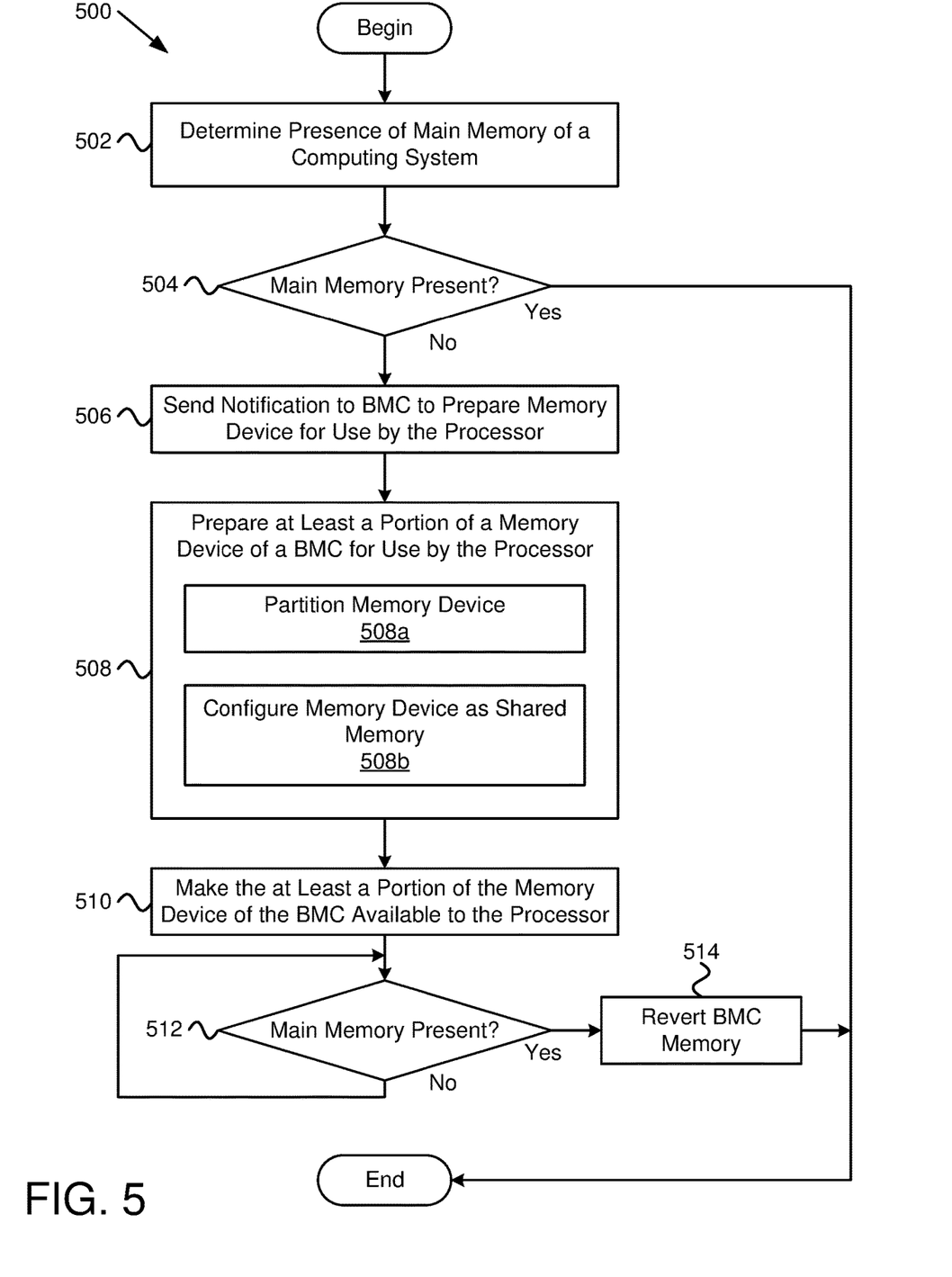
FIG. 5 is a schematic flow chart diagram illustrating another method for dynamic baseboard management controller memory use, according to various embodiments.

FIG. 5 depicts a schematic flow chart diagram describing one embodiment of a method 500 for dynamic baseboard management controller memory use. In some embodiments, the method 500 may be performed by a computing device 110, a BMC 130, a processor 112, a main memory 114, an FPGA, an ASIC, a memory management apparatus 102, a presence detection module 202, a memory preparation module 204, a memory presentation module 206, a memory partition module 302, a shared memory module 304, a notification module 306, a memory reverting module 308, a memory cleanup module 310, and/or the like.

In some embodiments, the method 500 begins and determines 502 presence of main memory 114 of a computing device 110. In some embodiments, if the method 500 determines 504 that the main memory 114 is present in the computing device 110, the method 500 ends. Otherwise, in some embodiments, the method 500 sends 506 a notification to the BMC 130 to prepare the at least a portion of a memory device 118 of the BMC 130 for use by the processor 112.

In some embodiments, the method 500 prepares 508 at least a portion of the memory device 118 of a BMC 130 for use by the processor 112. In such an embodiment, the method 500 creates 508a a new partition on the memory device 118 of the BMC 130. In another embodiment, the method 500 configures 508b the at least a portion of the memory device 118 of the BMC 130 as shared memory.

In some embodiments, the method 500 makes 510 the at least a portion of the memory device 118 of the BMC 130 available to the processor 112, e.g., over a system bus 120, over a CXL, over a PCIe connection, and/or the like. In some embodiments, the method 500 periodically checks 512 if main memory 114 is present in the computing device 110. If the method 500, in some embodiments, determines that main memory 114 is present in the computing device 110 (e.g., has been installed in the computing device 110), the method 500 reverts 514 the memory device 118 of the BMC 130 to an original state, and the method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    determining, by use of a processor, physical installation of main memory of a computing device;
    in response to determining that the main memory is not physically installed in the computing device, preparing at least a portion of a memory device of a baseboard management controller ("BMC") for use by the processor;
    making the at least a portion of the memory device of the BMC available to the processor; and
    reverting the memory device of the BMC to an original state in response to detecting physical installation of the main memory of the computing device such that the at least a portion of the memory device of the BMC is not available for use by the processor.

2. The method of claim 1, further comprising determining physical installation of the main memory of the computing device during a boot process of the computing device.

3. The method of claim 1, further comprising preparing the at least a portion of the memory device of the BMC for use by the processor by creating a new partition on the memory device of the BMC and making the new partition of the memory device of the BMC available to the processor.

4. The method of claim 1, further comprising preparing the at least a portion of the memory device of the BMC for use by the processor by configuring the at least a portion of the memory device of the BMC as shared memory and making the shared memory of the memory device of the BMC available to the processor.

5. The method of claim 1, further comprising making the at least a portion of the memory device of the BMC available for use by the processor as dynamic random access memory ("DRAM"), the DRAM accessible to the processor over a compute express link ("CXL").

6. The method of claim 1, further comprising sending a notification to the BMC to prepare the at least a portion of a memory device of the BMC for use by the processor in response to determining that the main memory is not physically installed in the computing device.

7. The method of claim 1, further comprising making the at least a portion of the memory device of the BMC available to the processor over at least one peripheral component interconnect express ("PCIe") bus of the computing device between the BMC and the processor.

8. The method of claim 1, further comprising erasing data stored on the at least a portion of the memory device of the BMC in response to reverting to the original state.

9. The method of claim 1, further comprising reverting the memory device of the BMC to an original state during a boot process of the computing device prior to determining physical installation of main memory of the computing device such that the at least a portion of a memory device of the BMC is not available for use by the processor.

10. The method of claim 1, wherein the main memory of the computing device comprises at least one dual in-line memory module ("DIMM").

11. An apparatus comprising:
    a processor; and
    non-transitory computer readable storage media storing code, the code being executable by the processor to perform operations comprising:
        determining physical installation of main memory of a computing device;
        in response to determining that the main memory is not physically installed in the computing device, preparing at least a portion of a memory device of a baseboard management controller ("BMC") for use by the processor;
        making the at least a portion of the memory device of the BMC available to the processor; and
        reverting the memory device of the BMC to an original state in response to detecting physical installation of the main memory of the computing device such that the at least a portion of the memory device of the BMC is not available for use by the processor.

12. The apparatus of claim 11, wherein the code is executable by the processor to perform operations comprising determining physical installation of the main memory of the computing device during a boot process of the computing device.

13. The apparatus of claim 11, wherein the code is executable by the processor to perform operations comprising preparing the at least a portion of the memory device of the BMC for use by the processor by creating a new partition on the memory device of the BMC and making the new partition of the memory device of the BMC available to the processor.

14. The apparatus of claim 11, wherein the code is executable by the processor to perform operations comprising preparing the at least a portion of the memory device of the BMC for use by the processor by configuring the at least a portion of the memory device of the BMC as shared memory and making the shared memory of the memory device of the BMC available to the processor.

15. The apparatus of claim 11, wherein the code is executable by the processor to perform operations comprising making the at least a portion of the memory device of the BMC available for use by the processor as dynamic random access memory ("DRAM"), the DRAM accessible to the processor over a compute express link ("CXL").

16. The apparatus of claim 11, wherein the code is executable by the processor to perform operations comprising sending a notification to the BMC to prepare the at least a portion of a memory device of the BMC for use by the processor in response to determining that the main memory is not physical installed in the computing device.

17. The apparatus of claim 11, wherein the code is executable by the processor to perform operations comprising making the at least a portion of the memory device of the BMC available to the processor over at least one peripheral component interconnect express ("PCIe") bus of the computing device between the BMC and the processor.

18. A method comprising:
   determining, by use of a processor, physical installation of main memory of a computing device;
   in response to determining that the main memory is not physically installed in the computing device, preparing at least a portion of a memory device of a baseboard management controller ("BMC") for use by the processor;
   making the at least a portion of the memory device of the BMC available to the processor; and
   reverting the memory device of the BMC to an original state during a boot process of the computing device subsequent to making the at least the portion of the memory device of the BMC available to the processor and prior to determining physical installation of main memory of the computing device such that the at least the portion of a memory device of the BMC is not available for use by the processor.

19. The method of claim 18, further comprising:
   preparing the at least a portion of the memory device of the BMC for use by the processor by creating a new partition on the memory device of the BMC and making the new partition of the memory device of the BMC available to the processor;
   preparing the at least a portion of the memory device of the BMC for use by the processor by configuring the at least a portion of the memory device of the BMC as shared memory and making the shared memory of the memory device of the BMC available to the processor; and/or
   making the at least a portion of the memory device of the BMC available for use by the processor as dynamic random access memory ("DRAM"), the DRAM accessible to the processor over a compute express link ("CXL").

20. The method of claim 18, further comprising reverting the memory device of the BMC to an original state in response to detecting physical installation of the main memory of the computing device such that the at least a portion of the memory device of the BMC is not available for use by the processor.

* * * * *